(12) United States Patent
Matsunaga (10) Patent No.: US 11,000,910 B2
(45) Date of Patent: May 11, 2021

(54) WIRE ELECTRICAL DISCHARGE MACHINE AND MACHINING METHOD

(71) Applicant: FANUC CORPORATION, Yamanashi (JP)

(72) Inventor: Tomoaki Matsunaga, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 241 days.

(21) Appl. No.: 15/869,790

(22) Filed: Jan. 12, 2018

(65) Prior Publication Data
US 2018/0200815 A1 Jul. 19, 2018

(30) Foreign Application Priority Data
Jan. 18, 2017 (JP) .............................. JP2017-006305

(51) Int. Cl.
*B23H 1/02* (2006.01)
*B23H 7/20* (2006.01)
*B23H 7/04* (2006.01)

(52) U.S. Cl.
CPC ................. *B23H 7/20* (2013.01); *B23H 1/02* (2013.01); *B23H 1/026* (2013.01); *B23H 7/04* (2013.01)

(58) Field of Classification Search
CPC ... B23H 7/00; B23H 7/04; B23H 7/14; B23H 7/20; B23H 1/02; B23H 1/026; B23H 1/022; B23H 1/024

(Continued)

(56) References Cited

U.S. PATENT DOCUMENTS 3,705,286 A * 12/1972 Kondo ................... B23H 1/024
219/69.13
3,997,753 A * 12/1976 Inoue ..................... B23H 1/022
219/69.13

(Continued)

FOREIGN PATENT DOCUMENTS

EP 3269483 A1 1/2018
GB 1266984 A 3/1972

(Continued)

OTHER PUBLICATIONS

English Abstract and Machine Translation for Japanese Publication No. JPS53-047047 A, published Apr. 27, 1978, 4 pgs.

(Continued)

*Primary Examiner* — Robert J Utama
*Assistant Examiner* — Ayub A Maye
(74) *Attorney, Agent, or Firm* — Fredrikson & Byron, P.A.

(57) ABSTRACT

A wire electrical discharge machine includes: a multiple number of switching elements connected in parallel with each other and configured to supply the machining current to the electrode gap to perform electrical discharge machining; a multiple number of switches each connected in series with the associated one of the multiple switching elements and configured to cut off each of the multiple switching elements; and a control device configured to perform control when at least one of the multiple switching elements fails so as to disconnect the failed switching elements by means of the associated switches and also change the machining conditions in accordance with the number of the failed switching elements.

13 Claims, 4 Drawing Sheets

(58) Field of Classification Search
USPC .............. 219/68, 69.1, 69.11, 69.12, 69.13
See application file for complete search history.

(56) References Cited

U.S. PATENT DOCUMENTS

| | | | | |
|---|---|---|---|---|
| 4,442,333 | A * | 4/1984 | Inoue | B23H 7/04 219/69.12 |
| 4,798,929 | A * | 1/1989 | Itoh | B23H 1/024 219/69.12 |
| 5,306,889 | A * | 4/1994 | Kaneko | B23H 7/04 219/69.12 |
| 5,352,859 | A * | 10/1994 | Kaneko | B23H 7/16 219/69.13 |
| 5,539,178 | A * | 7/1996 | Taneda | B23H 1/022 219/69.13 |
| 6,130,816 | A | 10/2000 | Kaneko et al. | |
| 6,291,791 | B1 * | 9/2001 | Fujita | B23H 1/02 200/82 R |
| 2006/0249483 | A1 * | 11/2006 | D'Amario | B23H 1/022 219/69.18 |

FOREIGN PATENT DOCUMENTS

| | | | |
|---|---|---|---|
| JP | 53-047097 | A | 4/1978 |
| JP | 5347047 | A | 4/1978 |
| JP | 10128620 | A | 5/1998 |
| JP | 11216620 | A | 8/1999 |
| JP | 2007-330043 | A | 12/2007 |
| JP | 2012-152043 | A | 8/2012 |
| JP | 2013201849 | A | 10/2013 |
| KR | 20100069038 | A | 6/2010 |

OTHER PUBLICATIONS

English Abstract and Machine Translation for Korean Publication No. 20100069038 A, published Jun. 24, 2010, 8 pgs.
Extended European Search Report dated Jun. 8, 2018 for related European Application No. 18152018.0, 8 pgs.
English Abstract and Machine Translation for Japanese Publication No. 2013-201849 A, published Oct. 3, 2013, 9 pgs.
English Abstract for Japanese Publication No. JPH11216620 A, published Aug. 10, 1999, 2 pgs.
English Abstract and Machine Translation for Japanese Publication No. 10-128620 A, published May 19, 1998, 8 pgs.
Untranslated Decision to Grant a Patent mailed by Japan Patent Office (JPO) for Application No. JP 2017-006305, dated Mar. 19, 2019, 3 pgs.
English Machine Translation of Decision to Grant a Patent mailed by Japan Patent Office (JPO) for Application No. JP 2017-006305, dated Mar. 19, 2019, 3 pgs.
Untranslated Notification of Reasons for Refusal mailed by Japan Patent Office (JPO) for Application No. JP 2017-006305, dated Oct. 30, 2018, 4 pgs.
English Machine Translation of Notification of Reasons for Refusal mailed by Japan Patent Office (JPO) for Application No. JP 2017-006305, dated Oct. 30, 2018, 4 pgs.
English Abstract and Machine Translation for Japanese Publication No. 53-047097 A, published Apr. 27, 1978, 7 pages.
English Abstract and Machine Translation for Japanese Publication No. 2012-152043 A, published Aug. 9, 2012, 24 pages.
English Abstract and Machine Translation for Japanese Publication No. 2007-330043 A, published Dec. 20, 2007, 8 pages.

* cited by examiner

| NUMBER OF DEFECTIVE SWITCHING ELEMENTS | k1 | k2 |
|---|---|---|
| 0 | 1 | 1 |
| 1 | 1.1 | 0.9 |
| 2 | 1.2 | 0.8 |
| 3 | 1.3 | 0.7 |

WIRE ELECTRICAL DISCHARGE MACHINE AND MACHINING METHOD

CROSS-REFERENCE TO RELATED APPLICATION

This application is based upon and claims the benefit of priority from Japanese Patent Application No. 2017-006305 filed on Jan. 18, 2017, the contents of which are incorporated herein by reference.

BACKGROUND OF THE INVENTION

Field of the Invention

The present invention relates to a wire electrical discharge machine and a machining method for machining a workpiece to be processed by applying voltage between an electrode gap formed by a wire electrode and the workpiece.

Description of the Related Art

Japanese Laid-Open Patent Publication No. 11-216620 discloses a power unit for electrical discharge machining having a plurality of switching elements connected in parallel with each other and in series between a workpiece and a DC power supply. It is also disclosed that a plurality of switches are connected in series with the corresponding switching elements in order to separate a switching element that is determined to be broken (out of order).

SUMMARY OF THE INVENTION

However, in the above-mentioned Japanese Laid-Open Patent Publication No. 11-216620, since the switching element that is determined to be faulty is merely separated, the electric current flowing through the other switching elements that are not separated increases. As a result, even the switching elements that are not determined to be faulty may fail, making it impossible to perform machining.

It is therefore an object of the present invention to provide a wire electrical discharge machine and a machining method that keep performing machining even when a broken switching element is cut off.

According to a first aspect of the present invention, a wire electrical discharge machine performing electrical discharge machining on a workpiece by supplying, according to machining conditions, machining current from machining power unit to an electrode gap formed between a wire electrode and a workpiece, includes: a plurality of switching elements connected in parallel with each other to supply the machining current to the electrode gap to perform electrical discharge machining; a plurality of switches each connected in series with one of the switching elements separate the switching elements; and a control device configured, when at least one of the multiple switching elements fails, to disconnect the failed switching elements by means of the switches and to change the machining conditions in accordance with the number of the failed switching elements.

According to a second aspect of the present invention, a machining method is used in a wire electrical discharge machine performing electrical discharge machining on a workpiece by supplying machining current from machining power unit to an electrode gap formed between a wire electrode and a workpiece according to machining conditions. The wire electrical discharge machine comprises: a plurality of switching elements connected in parallel with each other and configured to supply the machining current to the electrode gap to perform electrical discharge machining; and a plurality of switches each connected in series with one of the multiple switching elements to separate each of the multiple switching elements, and the machining method includes a control step of performing control when at least one of the switching elements fails so as to disconnect the failed switching elements by means of the switches and changing the machining conditions in accordance with the number of the failed switching elements.

According to the present invention, even if a switching element has broken down, the failed switching element is disconnected so that it is possible to continue machining. In addition, since the machining conditions are changed according to the number of failed switching elements, it is possible to prevent normal switching elements that have not broken down from failing. Therefore, it is possible to continue machining.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A wire electrical discharge machine and a machining method according to the present invention will be detailed hereinbelow by describing a preferred embodiment with reference to the accompanying drawings.

Figure 1:
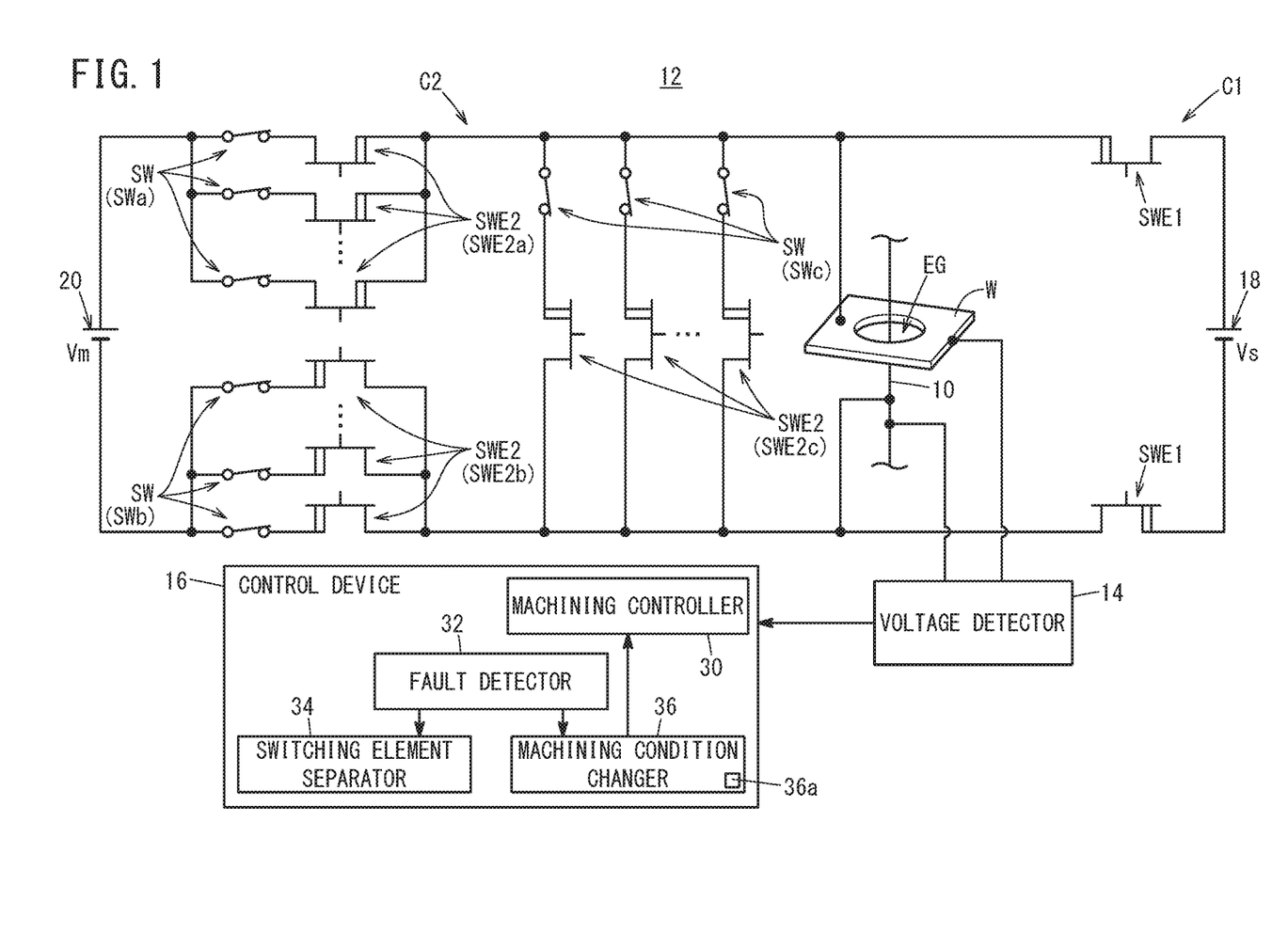
FIG. 1 is a configuration diagram of a wire electrical discharge machine in an embodiment.

FIG. 1 is a configuration diagram of a wire electrical discharge machine 12 for performing electrical discharge machining by applying voltage to an electrode gap (EG) formed between a wire electrode 10 and an object to be machined (workpiece) W for machining current (discharge current) to flow. The wire electrical discharge machine 12 includes: a circuit (hereinafter referred to as a spark initiating circuit) C1 for applying a voltage (spark initiation voltage) Vs across the electrode gap EG to induce discharge; a circuit (hereinafter referred to as a machining circuit) C2 for applying a voltage (machining voltage) Vm across the electrode gap EG for machining current to floe; a voltage detector 14 for detecting a voltage (hereinafter referred to as an electrode gap voltage) Vg across the electrode gap EG; and a control device 16.

The spark initiating circuit C1 has a power unit (hereinafter referred to as a spark initiation power unit) 18 and a switching element SWE1 composed of an FET or the like. The spark initiation power unit 18 has a DC power supply. In the present embodiment, in order to apply the voltage Vs of positive polarity to the electrode gap EG, the positive terminal (+ terminal) of the spark initiation power unit 18 is connected to the workpiece W while the negative terminal (− terminal) is connected to the wire electrode 10. Note that the spark initiation power unit 18 may be configured to selectively apply one of the voltage Vs of positive polarity and the voltage Vs of negative polarity to the electrode gap EG.

The switching element SWE1 is used to apply the voltage (spark initiation voltage) Vs of the spark initiation power unit 18 to the electrode gap EG in order to start a discharge in the electrode gap EG. The switching element SWE1 is arranged between the spark initiation power unit 18 and the electrode gap EG and connected in series therewith. When this switching element SWE1 is turned on, the voltage (spark initiation voltage) Vs of the spark initiation power unit 18 is applied to the electrode gap EG. That is, by switching the switching element SWE1 on and off, application of the voltage Vs to the electrode gap EG is turned on and off. Though in the example shown in FIG. 1 the switching element SWE1 is provided between the positive terminal of the spark initiation power unit 18 and the workpiece W and between the negative terminal of the spark initiation power unit 18 and the wire electrode 10, the switch may be arranged at only one of them.

The machining circuit C2 includes a power unit (hereinafter referred to as a machining power unit) 20 and a plurality of switching elements SWE2. The machining power unit 20 has a DC power supply. In the present embodiment, in order to apply the voltage Vm of positive polarity to the electrode gap EG, the positive terminal (+ terminal) of the machining power unit 20 is connected to the workpiece W while the negative terminal (− terminal) is connected to the wire electrode 10. Note that the machining power unit 20 may be configured to selectively apply one of the voltage Vm of positive polarity and the voltage Vm of negative polarity to the electrode gap EG.

The multiple switching elements SWE2 are provided to supply a machining current to the electrode gap EG to perform electrical discharge machining. The multiple switching elements SWE2 are divided into three groups. Multiple switching elements SWE2 that belong to the same group are connected in parallel with each other. The switching element SWE2 is formed of an FET or the like. In the present embodiment, in some cases, the multiple switching elements SWE2 belonging to the first group may be referred to as SWE2a, the multiple switching elements SWE2 belonging to the second group may be referred to as SWE2b, and the multiple switching elements SWE2 belonging to the third group may be referred to as SWE2c.

The multiple switching elements (first switching elements) SWE2a, SWE2b are used to supply the machining current from the machining power unit 20 to the electrode gap EG. Between the machining power unit 20 and the electrode gap EG, multiple switching elements SWE2a and SWE2b are each connected in series to the machining power unit 20 and the electrode gap EG while the multiple switching elements SWE2a and SWE2b are connected in parallel with each other. More specifically, between the positive terminal of the machining power unit 20 and the workpiece W, the multiple switching elements SWE2a are connected in series to the positive terminal of the machining power unit 20 and the workpiece W, and connected in parallel with each other. Between the negative terminal of the machining power unit 20 and the wire electrode 10, the multiple switching elements SWE2b are connected in series to the negative terminal of the machining power unit 20 and the wire electrode 10, and connected in parallel with each other.

All of the multiple switching elements SWE2a, SWE2b are turned on and off at the same time. When the multiple switching elements SWE2a and SWE2b are turned on, the voltage (machining voltage) Vm of the machining power unit 20 is applied across the electrode gap EG. That is, application of the machining voltage Vm to the electrode gap EG is turned on and off by turning on and off the multiple switching elements SWE2a and SWE2b. When the machining voltage Vm is applied to the electrode gap EG, a machining current (discharge current) flows through the electrode gap EG.

In the example shown in FIG. 1, both the group of switching elements SWE2a and the group of switching elements SWE2b are provided, but only one of them (for example, the group of switching elements SWE2a alone) may be provided.

The multiple switching elements (second switching elements) SWE2c are used to recirculate the machining current flowing through the electrode gap EG to the electrode gap EG. The multiple switching elements SWE2c are connected in parallel with the electrode gap EG. The switching elements SWE2c are all turned on and off at the same time.

The machining circuit C2 includes a plurality of switches SW connected in series with respective switching elements SWE2. The switch SW is used to separate from the machining circuit C2 the switching element SWE2 connected in series with the switch SW. Here, the switch SW that is connected in series to the switching element SWE2a may be referred to as SWa, the switch SW that is connected in series to the switching element SWE2b may be referred to as SWb, and the switch SW that is connected in series to the switching element SWE2c may be referred to as SWc in some cases. The switch (first switch) SWa is used to cut off the switching element SWE2a connected in series with the switch SWa from the machining circuit C2, and the switch (first switch) SWb is used to cut off the element SWE2b connected in series with the switch SWb from the machining circuit C2. The switch (second switch) SWc is used to cut off the switching element SWE2c connected in series with the switch SWc from the machining circuit C2. The switches SWa, SWb, SWc are normally-on switches which are normally closed.

In electrical discharge machining, since application of the spark initiation voltage Vs to the electrode gap EG and supply of the machining current through the electrode gap EG are repeated at high speed, the response frequency (On/Off frequency) of the switching elements SWE2a, SWE2b, SWE2c needs to be set higher. Since a switching element with a high response frequency can flow only a small current, multiple switching elements SWE2a, SWE2b, SWE2c are arranged and connected in parallel with each other in order to disperse the large machining current flowing through the gap EG. On the other hand, since the switches SWa, SWb, SWc are normally-On, the switches SWa, SWb, SWc need not have a high response frequency and thus switches with a low response frequency can be used. That is, the response frequency of the switches SWa, SWb, SWc may be lower than that of the switching elements SWE2a, SWE2b, SWE2c. The switches SW (SWa, SWb, SWc) may be switching elements such as FETs.

The control device 16 includes a processor such as a CPU, and a memory unit with programs stored therein. The program executed by the processor functions as the control device 16 of the present embodiment. The control device 16 includes a machining controller 30, a fault detector 32, a switching element separator 34, and a machining condition changer 36.

The machining controller 30 machines the workpiece W by controlling on/off of the switching elements SWE1, SWE2a, SWE2b and SWE2c according to the machining conditions.

The fault detector 32 detects failed switching elements (SWE2a, SWE2b and/or SWE2c) from among the multiple switching elements SWE2a, SWE2b, and SWE2c. The fault detector 32 outputs information (for example, information indicating positions) specifying the detected faulty switching elements SWE2a, SWE2b, and SWE2c to the switching element separator 34, and outputs the numbers of the faulty switching element SWE2a, SWE2b and SWE2c to the machining condition changer 36.

The switching element separator 34 controls the switches SW to separate the failed switching elements (hereinafter sometimes referred to as defective switching elements) SWE2 from the machining circuit C2. The switching element separator 34 separate defective switching elements SWE2 from the machining circuit C2 by turning off the switches SW connected in series with the defective switching elements SWE2. For example, when the defective switching element SWE2 is the switching elements SWE2a, the switch SWa connected in series with the defective switching element SWE2a is turned off, thereby separating the defective switching element SWE2a from the machining circuit C2. The machining condition changer 36 changes the machining conditions according to the numbers of the defective switching elements SWE2a, SWE2b and SWE2c.

Figure 2:
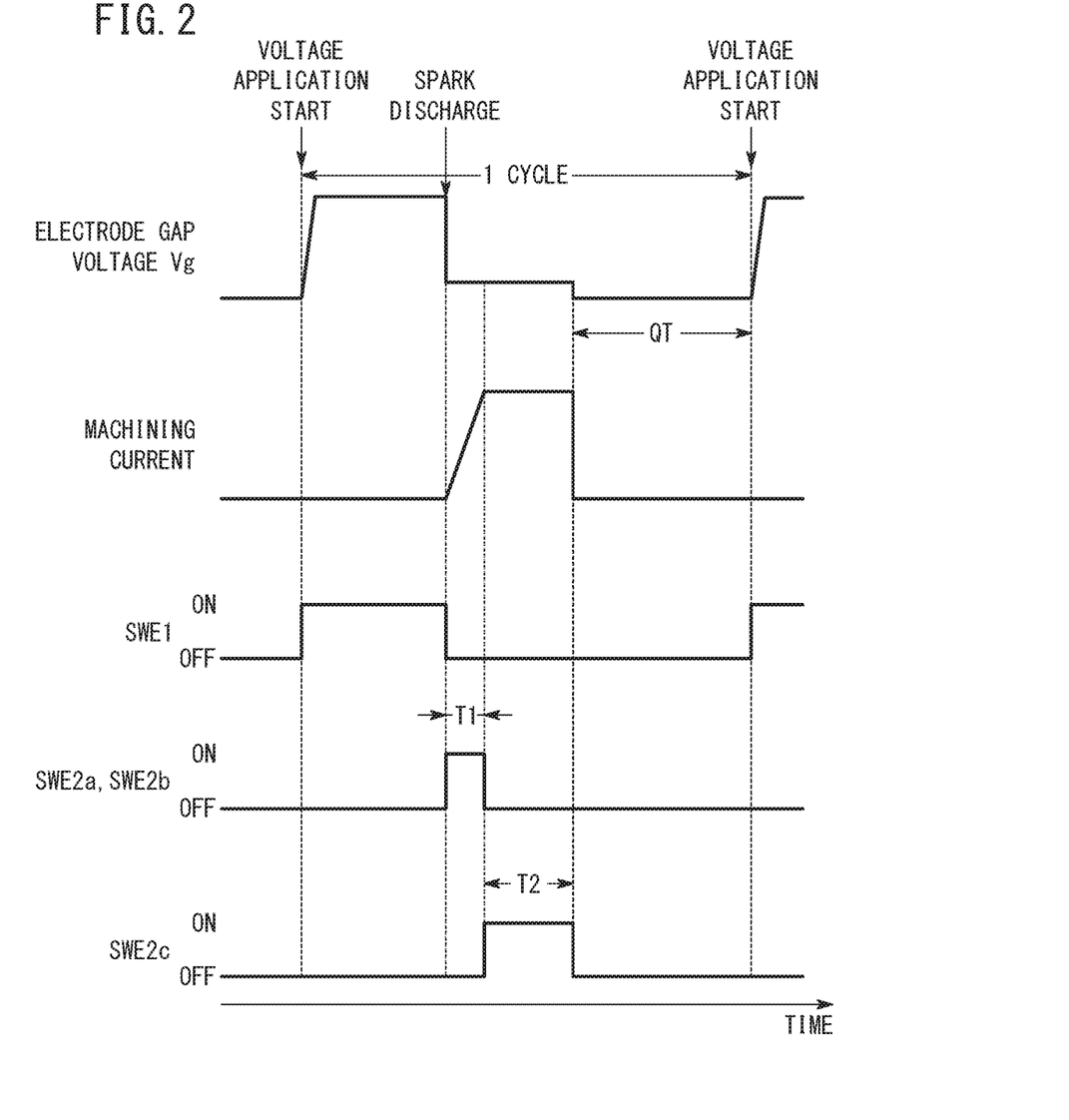
FIG. 2 is a diagram showing a time chart of on/off of switching elements controlled by a machining controller.

Referring to FIG. 2, control of the switching elements SWE1, SWE2a, SWE2b and SWE2c by the machining controller 30 will be described. FIG. 2 is a time chart showing on/off states of the switching elements SWE1 and SWE2a to SWE2c controlled by the machining controller 30. Here, it is assumed that all the switching elements SWE1 and SWE2a to SWE2c are initially set in off-state.

The control device 16 turns on all the multiple switching elements SWE1 and applies the voltage (spark initiation voltage) Vs of the spark initiation power unit 18 to the electrode gap EG. When electric discharge occurs in the electrode gap EG, the control device 16 turns off all the multiple switching elements SWE1 and turns on all the multiple switching elements SWE2a and SWE2b. As a result, the voltage (machining voltage) Vm of the machining power unit 20 is applied across the electrode gap EG so that a machining current flows. When the switching elements SWE2a and SWE2b are turned on, the machining current flowing through the electrode gap EG gradually increases with time. Since the electrode gap voltage Vg jumps down to the arc voltage when spark discharge occurs in the electrode gap EG, the controller 16 determines that discharge has occurred when the electrode gap voltage Vg detected by the voltage detector 14 falls.

After a lapse of a predetermined time (first predetermined time) T1 determined according to the machining conditions from when the switching elements SWE2a and SWE2b were turned on, the control device 16 turns off all the multiple switching elements SWE2a and SWE2b and turns on the multiple switching elements SWE2c. When the switching elements SWE2c are turned on, the machining current flowing through the electrode gap EG is recirculated to the electrode gap EG. Therefore, while the switching elements SWE2c are on, the quantity (magnitude) of the machining current flowing through the electrode gap EG is maintained.

The control device 16 turns off all the switching elements SWE2c after the passage of a predetermined time (second predetermined time) T2 determined according to the machining conditions from when the switching elements SWE2c were turned on. As a result, the supply of the machining current to the electrode gap EG ends. Then, after the passage of a quiescent time QT determined according to the machining conditions from when the supply of the machining current to the electrode gap EG was terminated, the control device turns on again all the multiple switching elements SWE1 to apply the spark initiation voltage Vs across the electrode gap EG. In this way, the operations above are repeated. That is, the cycle, defined as the period from the start of application of the spark initiation voltage Vs to the end of the quiescent time QT, is repeated continuously to machine the workpiece W.

Figure 3:
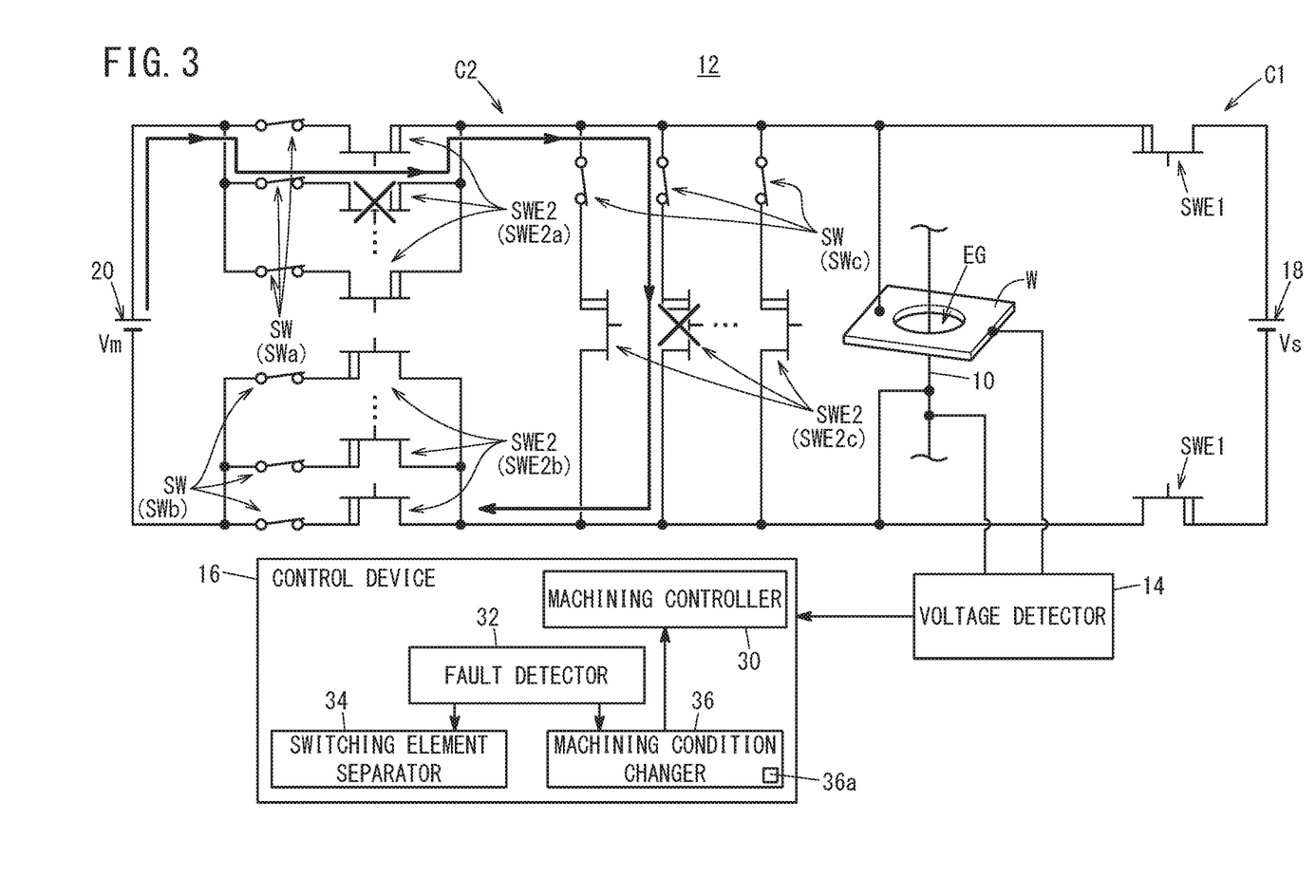
FIG. 3 is a diagram showing an example when a switching element has failed.

Herein, when, for example, one switching element SWE2a and one switching element SWE2c among the multiple switching elements SWE2a, SWE2b and SWE2c have broken down (short-circuited) as shown in FIG. 3, the machining current from the machining power unit 20 flows through the failed switching elements SWE2a and SWE2c and thus no machining current flows through the electrode gap EG and no machining can be done. Further, when a switching element SWE2 is defective, it is impossible to control the machining current supplied to the electrode gap EG and thus appropriate machining cannot be done. To deal with this problem, in the present embodiment the fault detector 32 detects defective switching elements SWE2a, SWE2b, SWE2c and the switching element separator 34 separates the detected switching elements SWE2a, SWE2b, SWE2c from the machining circuit C2.

However, even if the defective switching elements SWE2a, SWE2b, SWE2c are disconnected from the machining circuit C2, the amount of machining current flowing through the electrode gap EG does not change. Therefore, as a result of the disconnection of the defective switching element SWE2, more of the machining current flows through the remaining normal switching elements SWE2 belonging to the same group as the defective switching element SWE2 (the remaining normal switching elements SWE2 connected in parallel with the defective switching element SWE2). For example, as shown in FIG. 3, when the switching elements SWE2a and SWE2c have failed, the machining current flowing through the other normal switching elements SWE2a and SWE2c increases. This may cause damage to the normal switching elements SWE2. Further, as the number of defective switching elements increases in one group of the switching elements SWE2 (the multiple switching elements SWE2 connected in parallel with each other), the current flowing through the other switching elements SWE2 in the same group increases. In the present embodiment, in order to solve this problem the machining conditions can be changed by the machining condition changer 36.

The machining condition changer 36 changes the machining conditions based on the largest number (hereinafter from time to time simply referred to as the number of the defective switching elements SWE2) among the number of the defective switching elements SWE2a, the number of the defective switching elements SWE2b, and the number of the defective switching elements SWE2c. Choice of the machining conditions for the group with the largest number of defective switches SWE2 makes it possible to protect all the normal switching elements SWE2a, SWE2b, SWE2c. For example, in the case shown in FIG. 3, since the number of defective switching elements SWE2a is 1, the number of defective switching elements SWE2b is 0 and the number of defective switching elements SWE2c is 1, the largest number is 1. Hence, the machining conditions are changed according to the number (1).

The machining condition changer 36 changes the machining conditions according to the number of the defective switching elements SWE2 in a manner that an average value of electric currents flowing through the normal switching elements SWE2a, SWE2b and SWE2c per predetermined period PT does not exceed a predetermined value. This predetermined value is determined based on an average value of electric currents that flow through all the multiple switching elements SWE2a, SWE2b, SWE2c per predetermined period PT when all the switching elements SWE2a, SWE2b and SWE2c work without failures. Further, the predetermined period PT is a duration including one cycle or more (e.g., a duration of 10 cycles). It is preferable that the machining condition changer 36 changes the machining conditions so that the average value of electric currents flowing through each of the normal switching elements SWE2a, SWE2b and SWE2c per predetermined period PT will not change before and after the failures.

The machining condition changer 36 may change the quiescent time QT according to the number of the defective switching elements SWE2. The machining condition changer 36 may make the quiescent time QT longer as the number of the defective switching elements SWE2 increases. This is because a longer quiescent time QT lowers the average value of electric currents flowing through the switching elements SWE2a, SWE2b and SWE2c per predetermined period PT. The machining controller 30 determines the timing at which the switching element SWE1 is turned on, based on the quiescent time QT changed by the machining condition changer 36.

Further, the voltage (machining voltage) Vm of the machining power unit 20 may be made variable, and the voltage Vm of the machining power unit 20 may be included in the machining conditions. In this case, the machining condition changer 36 may change the voltage Vm of the machining power unit 20 according to the number of the defective switching elements SWE2. The machining condition changer 36 may lower the voltage Vm of the machining power unit 20 as the number of the defective switching elements SWE2 is greater. This is because the average value of electric currents flowing through the switching elements SWE2a, SWE2b and SWE2c per predetermined period PT decreases as the voltage Vm of the machining power unit 20 lowers. The machining controller 30 controls the machining power unit 20 so that the machining power unit 20 outputs the voltage Vm changed by the machining condition changer 36.

In the present embodiment, the machining condition changer 36 changes the quiescent condition and the voltage Vm according to the number of the defective switching elements SWE2. The machining condition changer 36 changes the quiescent time QT by multiplying the predetermined quiescent time QT (hereinafter referred to as QTd) by a compensation coefficient k1. The quiescent time QT is given by the relational expression (Ex. 1): $QT = QTd \times k1$, and when the number of the defective switching elements SWE2 is 0, the compensation coefficient k1 is 1. In addition, the machining condition changer 36 changes the voltage Vm by multiplying the predetermined voltage Vm (hereinafter referred to as Vmd) by a compensation coefficient k2. The voltage Vm is given by the relational expression (Ex. 2): $Vm = Vmd \times k2$, and when the number of the defective switching elements SWE2 is 0, the compensation coefficient k2 is 1.

Figure 4:
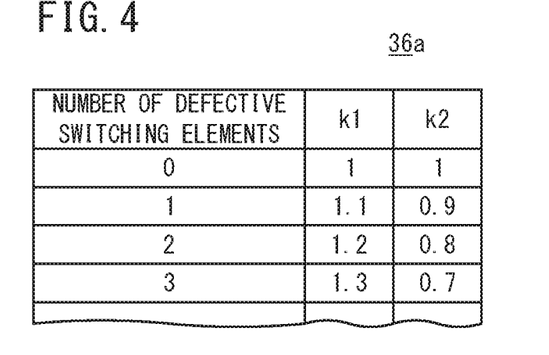
FIG. 4 is a diagram showing the content of a table in a machining condition changer.

The machining condition changer 36 has a table 36a (see FIG. 4) storing compensation coefficients k1, k2 for each number of defective switching elements SWE2, and changes the quiescent time QT and the voltage Vm based on the table 36a. In the example shown in FIG. 4, when the number of defective switching elements SWE2 is 1, the compensation coefficient k1 is "1.1" and the compensation coefficient k2 is "0.9". When the number of defective switching elements SWE2 is 2, the compensation coefficient k1 is "1.2" and the compensation coefficient k2 is "0.8". Thus, as the number of defective switching elements SWE2 increases, the value of the compensation coefficient k1 increases and the value of the compensation coefficient k2 decreases. Therefore, as the number of defective switching elements SWE2 increases, the quiescent time QT becomes longer and the voltage Vm becomes lower. Although herein the quiescent time QT and the voltage Vm are configured to change in accordance with the number of the defective switching elements SWE2, one of the quiescent time QT and the voltage Vm alone may be changed.

Herein, by switching on/off states of the multiple switches SW (SWa, SWb, SWc), the circuit state of the machining circuit C2 can be switched. Based on the electrode gap voltage Vg detected by the voltage detector 14 when the circuit state of the machining circuit C2 is switched by turning on/off the multiple switches SW (SWa, SWb, SWc), the fault detector 32 detects defective switching elements SWE2. The fault detector 32 detects a defective switching element SWE2 based on the electrode gap voltage Vg detected by the voltage detector 14 in each circuit state.

When the circuit state is normal (when switching elements SWE2 constituting the circuit state are not broken), the electrode gap voltage Vg takes a value falling within a predetermined normal range. However, if the circuit state is anomaly (when there are defective switching elements SWE2 that constitute the circuit state), the electrode gap voltage Vg takes a value falling outside the predetermined normal range. Therefore, by checking the electrode gap voltage Vg, it is possible to judge whether the circuit state is normal or not. Also, the normal/anomaly pattern of each circuit state varies depending on the locations of the defective switching elements SWE2 (SWE2a, SWE2b, SWE2c). Therefore, the fault detector 32 can identify defective switching elements in accordance with the normal/anomaly of each circuit state.

As disclosed in Japanese Laid-Open Patent Publication No. 11-216620 cited as a related art document, the fault detector 32 may be equipped with a detecting circuit that detects the operation states of the switching elements SWE2a, SWE2b, and SWE2c (whether or not the switches are in a conductive state) so as to detect failures of the switching elements SWE2a, SWE2b, SWE2c based on the detection signals detected by the detecting circuit. Also, other methods may be used to detect defective switching elements SWE2.

Though in the above-described embodiment, a plurality of switching elements SWE2a, a plurality of switching elements SWE2b and a plurality of switching elements SWE2c are provided, no switching elements SWE2c may be provided, or only one switching element SWE2c may be provided. Furthermore, only one of the group of switching elements SWE2a and the group of switching elements SWE2b may be provided. Further, only one switching element SWE2a and SWE2b may be provided. When both the switching elements SWE2a and the switching elements SWE2b are provided, it is preferable that the two groups have the same number of switching elements.

For example, instead of providing the switching elements SWE2b, a plurality of switching elements SWE2a being connected in parallel with each other and only one switching element SWE2c may be provided. In this case, the switches SWb and SWc that are connected in series to the switching elements SWE2b and SWE2c may be omitted.

As described heretofore, the wire electrical discharge machine 12 described in the above embodiment performs electrical discharge machining on the workpiece W by supplying machining current from the machining power unit 20 to the electrode gap EG formed between the wire electrode 10 and the workpiece W according to the machining conditions. This wire electrical discharge machine 12 includes: multiple switching elements SWE2 connected in parallel with each other to supply the machining current to the electrode gap EG to perform electrical discharge machining; multiple switches SW each connected in series with the associated one of the multiple switching elements SWE2 to separate each of the multiple switching elements SWE2; and the control device 16 configured, when at least one of the multiple switching elements SWE2 fails, to disconnect the failed switching elements SWE2 by means of the associated switches SW and also to change the machining conditions in accordance with the number of the failed switching elements SWE2.

As a result, even if a switching element SWE2 has broken down, the failed switching element SWE2 is disconnected. Therefore, it is possible to continue machining. In addition, since the machining conditions are changed according to the number of failed switching elements SWE2, it is possible to prevent normal switching elements SWE2 that are working from failing. Therefore, it is possible to continue machining.

The multiple switching elements SWE2 include multiple switching elements SWE2a (or SWE2b) connected in parallel with each other and arranged in series with the machining power unit 20 and the electrode gap EG between the electrode gap EG and the machining power unit 20 to supply the machining current from the machining power unit 20 to the electrode gap EG. The multiple switches SW include multiple switches SWa (or SWb) each connected in series with the associated one of the multiple switching elements SWE2a (or SWE2b) to separate each of the multiple switching elements SWE2a (or SWE2b). The control device 16, when at least one of the multiple switching elements SWE2a (or SWE2b) fails, disconnects the failed switching elements SWE2a (or SWE2b) by means of the associated switches SWa (or SWb) and also changes the machining conditions in accordance with the number of the failed switching elements SWE2a (or SWE2b).

With this configuration, even if a switching element SWE2a (or SWE2b) has broken down, the failed switching element SWE2a (or SWE2b) is disconnected and thus it is possible to continue machining. In addition, since the machining conditions are changed according to the number of failed switching elements SWE2a (or SWE2b), it is possible to prevent normal switching elements SWE2 that have not broken down from failing. Therefore, it is possible to continue machining.

The group of multiple switching elements SWE2a and the multiple switches SWa, and the group of the multiple switching elements SWE2b and the multiple switches SWb are disposed between the machining power unit 20 and the workpiece W, and between the machining power unit 20 and the wire electrode 10, respectively. The control device 16 changes the machining conditions, based on the number of failed switching elements SWE2a located between the machining power unit 20 and the workpiece W or the number of failed switching elements SWE2b located between the machining power unit 20 and the wire electrode 10, whichever is the larger.

As a result, even if switching elements SWE2a and SWE2b have broken down, the failed switching elements SWE2a and SWE2b are disconnected and thus the machining can be continued. In addition, since the machining conditions are changed based on the number of failed switching elements SWE2a or the number of failed switching elements SWE2b, whichever is the larger, it is possible to prevent normal switching elements SWE2 that have not broken down from failing and thus machining can be continued.

The multiple switching elements SWE2 include multiple switching elements SWE2c connected in parallel with the electrode gap EG so as to recirculate the machining current that has been supplied to the electrode gap EG by the machining power unit 20, to the electrode gap EG. The multiple switches SW include a plurality of switches SWc each connected in series with the associated one of the switching elements SWE2c so as to cut off each of the multiple switching elements SWE2c. When at least one of the multiple switching elements SWE2c fails, the control device 16 separates failed switching elements SWE2c by means of the associated switch SWc and change the machining conditions, based on the number of failed switching elements SWE2a (or SWE2b) connected in series with the electrode gap EG and the machining power unit 20 or the number of failed switching elements SWE2c connected in parallel with the electrode gap EG, whichever is the larger.

As a result, even when a switching element SWE2c has broken down, the defective switching element SWE2c is disconnected and thus it is possible to continue machining. Further, since the machining conditions are changed according to the number of the failed switching elements SWE2a (or SWE2b) or the number of switching elements SWE2c, whichever is the larger, it is possible to prevent non-defective normal switching elements SWE2 from failing and hence machining can be continued.

The control device 16 changes the machining conditions according to the number of the failed switching elements SWE2 in a manner that the average value of electric currents flowing through each switching element of the non-defective switching elements SWE2 per predetermined period PT does not exceed a predetermined value. This makes it possible to prevent non-defective normal switching elements SWE2 from failing even when the failed switching elements SWE2 have been separated.

The predetermined value is determined based on the average value of electric currents flowing through each of the multiple switching elements SWE2 per predetermined period PT while all the multiple switching elements SWE2 is working properly. This makes it possible to prevent non-defective normal switching elements SWE2 from failing even when the failed switching elements SWE2 have been separated.

The spark initiation voltage Vs for causing a discharge is applied across the electrode gap EG before the machining current is supplied. The machining conditions include a quiescent time QT from when supply of the machining current to the electrode gap EG is completed to when the spark initiation voltage Vs is applied again. The control device 16 makes the quiescent time QT longer as the number of the failed switching elements SWE2 increases. This configuration makes it possible to prevent non-defective normal switching elements SWE2 from failing even when the failed switching elements SWE2 have been separated.

The machining conditions include a voltage Vm output from the machining power unit 20. The control device 16 lowers the voltage Vm output from the machining power unit 20 as the number of the failed switching elements SWE2 increases. With this configuration, it is possible to prevent non-defective normal switching elements SWE2 from failing even when the failed switching elements SWE2 have been separated.

The control device 16 includes the fault detector 32 for detecting defective switching elements SWE2. As a result, it is possible to detect defective switching elements SWE2.

The wire electrical discharge machine 12 includes the voltage detector 14 for detecting the voltage Vg across the gap EG. Depending on the ON/OFF states of the multiple switches SW, the circuit state of connecting the machining power unit 20 and the electrode gap EG is switched. The fault detector 32 switches the circuit states by turning on and off the multiple switches SW to locate a failed switching element SWE2 based on the voltage Vg across the electrode gap EG detected by the voltage detector 14 in each of the circuit states. Thereby, it is possible to accurately detect defective switching element SWE2.

The specific configuration of the invention is not limited to the embodiments above, but changes in design and the like without departing from the gist of the present invention should also be included in the present invention.

What is claimed is:

1. A wire electrical discharge machine performing electrical discharge machining on a workpiece by supplying, according to machining conditions, machining current from a machining power unit to an electrode gap formed between a wire electrode and a workpiece, comprising:
    a plurality of switching elements connected in parallel with each other, wherein each of the plurality of switching elements supply the machining current to the electrode gap at the same time to perform electrical discharge machining;
    a plurality of switches each connected in series with one of the switching elements to separate each of the switching elements from each other, wherein the plurality of switches are normally-on switches which are normally closed; and
    a control device configured, only when at least one of the switching elements fails, to disconnect only the failed switching elements by means of the switches and to change the machining conditions in accordance with the number of the failed switching elements, wherein the failed switching elements are not replaced with other switching elements and the machining current is supplied by a remainder of the plurality of switching elements during the machining of the workpiece.

2. The wire electrical discharge machine according to claim 1, wherein:
    the switching elements include a plurality of first switching elements connected in parallel with each other and arranged in series with the machining power unit and the electrode gap between the electrode gap and the machining power unit to supply the machining current from the machining power unit to the electrode gap;
    the switches include a plurality of first switches each connected in series with one of the first switching elements to separate each of the first switching elements; and
    the control device is configured, when at least one of the switching elements fails, to disconnect the failed switching elements by means of the switches and to change the machining conditions in accordance with the number of the failed switching elements.

3. The wire electrical discharge machine according to claim 2, wherein:
    the first switching elements and the first switches arranged between the machining power unit and the workpiece and between the machining power unit and the wire electrode; and,
    the control device is configured to change the machining conditions, based on the number of failed first switching elements arranged between the machining power unit and the workpiece or the number of failed first switching elements arranged between the machining power unit and the wire electrode, whichever is the larger.

4. The wire electrical discharge machine according to claim 2, wherein:
    the switching elements include a plurality of second switching elements connected in parallel with the electrode gap so as to recirculate the machining current that has been supplied to the electrode gap by the machining power unit, to the electrode gap;
    the switches include a plurality of second switches each connected in series with one of the second switching elements so as to separate the second switching elements; and
    when at least one of the second switching elements fails, the control device is configured to separate failed second switching elements by means of the second switches and change the machining conditions, based on the number of failed first switching elements connected in series with the electrode gap and the machining power unit or the number of failed second switching elements connected in parallel with the electrode gap, whichever is the larger.

5. The wire electrical discharge machine according to claim 1, wherein the control device is configured to change the machining conditions according to the number of the failed switching elements in a manner that an average value of electric currents flowing through normal switching elements per predetermined period does not exceed a predetermined value.

6. The wire electrical discharge machine according to claim 5, wherein the predetermined value is determined based on an average value of electric currents that flow through each of the switching elements per predetermined period when all the switching elements work without failure.

7. The wire electrical discharge machine according to claim 1, wherein:
    a spark initiation voltage for causing a discharge is applied across the electrode gap before the machining current is supplied;
    the machining conditions include a quiescent time from when supply of the machining current to the electrode gap is completed to when the spark initiation voltage is applied again; and
    the control device is configured to make the quiescent time longer as the number of the failed switching elements increases.

8. The wire electrical discharge machine according to claim 1, wherein:
    the machining conditions include a voltage output from the machining power unit; and
    the control device configured to lower the voltage output from the machining power unit as the number of the failed switching elements increases.

9. The wire electrical discharge machine according to claim 1, wherein the control device comprises a fault detector for detecting defective switching elements.

10. The wire electrical discharge machine according to claim 9, further comprising a voltage detector for detecting the voltage across the gap, wherein:
- depending on the ON/OFF states of the switches, circuit states of connecting the machining power unit and the electrode gap are switched; and
- the fault detector is configured to switch the circuit states by turning on and off the switches and locate a failed switching element based on the voltage across the electrode gap detected by the voltage detector in each of the switched circuit states.

11. A machining method for a wire electrical discharge machine performing electrical discharge machining on a workpiece by supplying machining current from a machining power unit to an electrode gap formed between a wire electrode and a workpiece according to machining conditions, wherein
the wire electrical discharge machine comprises:
- a plurality of switching elements connected in parallel with each other, wherein each of the plurality of switching elements supply the machining current to the electrode gap at the same time to perform electrical discharge machining; and
- a plurality of switches each connected in series with one of the switching elements to separate each of the switching elements from each other, wherein the plurality of switches are normally-on switches which are normally closed, the machining method comprising a control step of disconnecting only the failed switching elements by means of the switches and changing the machining conditions in accordance with the number of the failed switching elements only when at least one of the switching elements fails, wherein the failed switching elements are not replaced with other switching elements and the machining current is supplied by a remainder of the plurality of switching elements during the machining of the workpiece.

12. The machining method according to claim 11, wherein:
- a spark initiation voltage for causing a discharge is applied across the electrode gap before the machining current is supplied;
- the machining conditions include a quiescent time from when supply of the machining current to the electrode gap is completed to when the spark initiation voltage is applied again; and
- in the control step, the quiescent time is made longer as the number of the failed switching elements increases.

13. The machining method according to claim 11, wherein:
- the machining conditions include a voltage output from the machining power unit; and
- in the control step, the voltage output from the machining power unit is made lower as the number of the failed switching elements increases.

* * * * *